United States Patent
Aurongzeb et al.

(10) Patent No.: US 9,703,335 B2
(45) Date of Patent: Jul. 11, 2017

(54) INFORMATION HANDLING SYSTEM CHASSIS WITH ANISOTROPIC CONDUCTANCE

(71) Applicants: Deeder M. Aurongzeb, Round Rock, TX (US); Andrew T. Sultenfuss, Leander, TX (US)

(72) Inventors: Deeder M. Aurongzeb, Round Rock, TX (US); Andrew T. Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 207 days.

(21) Appl. No.: 13/741,173

(22) Filed: Jan. 14, 2013

(65) Prior Publication Data
US 2014/0198438 A1 Jul. 17, 2014

(51) Int. Cl.
G06F 1/16 (2006.01)
H05K 7/00 (2006.01)
G06F 1/20 (2006.01)

(52) U.S. Cl.
CPC .......... G06F 1/20 (2013.01); G06F 1/16 (2013.01); G06F 1/203 (2013.01)

(58) Field of Classification Search
CPC ..................................... G06F 1/20; G06F 1/16
USPC ............ 361/679.01–679.45, 679.55–679.61, 361/724–727
See application file for complete search history.

(56) References Cited

U.S. PATENT DOCUMENTS

| | | | | |
|---|---|---|---|---|
| 4,098,943 A | * | 7/1978 | Degginger | B29C 70/00 156/244.12 |
| 4,781,967 A | * | 11/1988 | Legge | B32B 5/12 162/900 |
| 5,087,509 A | * | 2/1992 | Kuromitsu | H01L 23/15 156/89.15 |
| 5,597,450 A | * | 1/1997 | Baker | D21F 1/0036 139/383 A |
| 6,316,356 B1 | * | 11/2001 | Farrar | H01L 21/76877 257/E21.585 |
| 8,111,505 B2 | * | 2/2012 | Raff | G06F 1/1616 361/679.02 |
| 8,199,468 B2 | * | 6/2012 | Raff | G06F 1/1616 361/679.02 |
| 8,876,357 B2 | * | 11/2014 | Kasai | G02F 1/133604 362/632 |
| 9,127,274 B2 | * | 9/2015 | Akinc | C12N 15/113 |
| 2003/0040130 A1 | * | 2/2003 | Mayur | G06F 17/5018 438/14 |
| 2003/0124310 A1 | * | 7/2003 | Ellis | B32B 5/18 428/138 |
| 2005/0160752 A1 | * | 7/2005 | Ghoshal | G06F 1/203 62/259.2 |

(Continued)

OTHER PUBLICATIONS

Abstract to "Structure of disordered gold-polymer thin films using small angle x-ray scattering" by F.S. Teixeira et al. at J. Appl. Phys. 108, 093505 (2010) Nov. 2010.

(Continued)

*Primary Examiner* — Courtney Smith
*Assistant Examiner* — Rashen E Morrison
(74) *Attorney, Agent, or Firm* — Baker Botts L.L.P.

(57) ABSTRACT

An information handling system is disclosed. The information handling system comprises a chassis including a metal base, and a metal insulation layer, and a processing unit coupled to the chassis.

9 Claims, 4 Drawing Sheets

(56) References Cited

U.S. PATENT DOCUMENTS

| | | | | |
|---|---|---|---|---|
| 2006/0070447 A1* | 4/2006 | Agami | ................... | G01L 19/04 |
| | | | | 73/708 |
| 2007/0202314 A1* | 8/2007 | Youn | ...................... | B32B 27/12 |
| | | | | 428/297.4 |
| 2009/0147175 A1* | 6/2009 | Tsumura et al. | ................ | 349/58 |
| 2010/0066937 A1* | 3/2010 | Yamashita | ........... | G02B 6/0085 |
| | | | | 349/58 |
| 2010/0092770 A1* | 4/2010 | Wadahara | ............. | B29C 43/003 |
| | | | | 428/339 |
| 2010/0163549 A1* | 7/2010 | Gagas | ................. | H05B 6/1209 |
| | | | | 219/622 |
| 2011/0090632 A1* | 4/2011 | Raff | ...................... | G06F 1/1616 |
| | | | | 361/679.27 |
| 2011/0143495 A1* | 6/2011 | Pitera | ................ | H01L 31/0687 |
| | | | | 438/94 |
| 2014/0013132 A1* | 1/2014 | de Rochemont | ......... | G06F 1/26 |
| | | | | 713/320 |
| 2015/0179917 A1* | 6/2015 | Greer | ................. | H01L 39/2493 |
| | | | | 505/446 |
| 2015/0206820 A1* | 7/2015 | Standing | .............. | H01L 23/367 |
| | | | | 257/717 |

OTHER PUBLICATIONS

"Bi(111) thin film with insulting interior but metallic surfaces" by Shunhae Xiao et al. at Jan. 9, 2012.

\* cited by examiner

INFORMATION HANDLING SYSTEM CHASSIS WITH ANISOTROPIC CONDUCTANCE

TECHNICAL FIELD

The present disclosure relates generally to information handling systems, and more particularly to heat transfer within information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handlings systems, such as laptop computers, tablet computers, and/or mobile devices (e.g., personal digital assistants or smart phones) are becoming smaller in size to meet consumer demand. Moreover, the processing power of such information handling systems is increasing to meet consumer demand for faster and more powerful devices. Information handling systems configured to handle more information, and at faster rates, generally generate more heat. Accordingly, information handling systems such as laptop computers, tablet computers, and/or mobile devices must manage and dissipate heat in an effective manner despite significant size constraints.

SUMMARY

In accordance with teachings of the present disclosure, disadvantages and problems associated with chassis for information handling systems have been substantially reduced or eliminated. In one embodiment of the present disclosure, an information handling system chassis is disclosed. The information handling system comprises a chassis comprising a metal base and a metal insulation layer, and a processing unit coupled to the chassis.

In another embodiment of the present disclosure, a method for manufacturing an information handling system chassis is disclosed. The method comprises providing a metal base, depositing a first layer comprising a first metal, depositing a second layer comprising a second metal, and annealing the first metal and the second metal into a disordered-phase composition, wherein at least one of the first metal and the second metal has a low thermal conductance.

In another embodiment of the present disclosure, a method for manufacturing an information handling system chassis is disclosed. The method comprises providing a metal base, placing a first sheet of metal laminate comprising a first metal on the base, placing a second sheet of metal laminate comprising a second metal on the first sheet of metal laminate, and diffusion bonding the first sheet of metal laminate and the second sheet of metal laminate.

BRIEF DESCRIPTION OF THE DRAWINGS

A more complete understanding of the disclosed embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
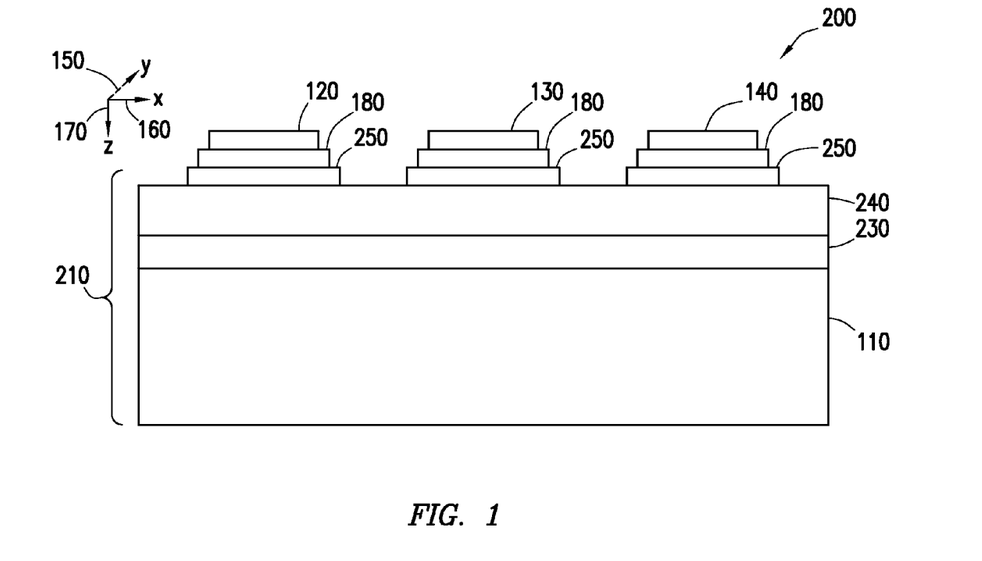
FIG. 1 illustrates a side view of certain components of an information handling system, in accordance with certain embodiments of the present disclosure.

FIG. 1 illustrates a side view of certain components of an information handling system 200, in accordance with certain embodiments of the present disclosure. Information handling system 200 may include a central processing unit ("CPU") 120, a graphics processing unit ("GPU") 130, a wireless chip 140 that may be part of a wireless chip set, a mounting structure 180, and a chassis 210. Chassis 210 may include a metal base 110, a reflective layer 230, an insulation layer 240, and a conductive layer 250.

Components of information handling system 200 that handle, transmit, and/or receive information, such as CPU 120, GPU 130, and wireless chip 140, may be referred to generally as "processing units." Processing units such as CPU 120, GPU 130, and wireless chip 140 may be physically coupled to chassis 210 via one ore more mounting structures 180. In some embodiments, mounting structure 180 may include a printed circuit board ("PCB") that may allow for devices such as CPU 120, CPU 130, and wireless chip 140 to electrically communicate with other devices. Moreover, in some embodiments, mounting structure 180 may include a heat sink that may conduct heat from devices such as CPU 120, GPU 130, and wireless chip 140, to the features underneath mounting structure 180. Processing units such as CPU 120, GPU 130, and/or wireless chip 140 may generate heat when they are handling, receiving, and/or transmitting information. In some embodiments of information handling system 200, including but not limited to tablet computers and/or mobile devices, information handling system 200 may also include a display unit (not expressly shown) that may be located, for example, above chassis 210, CPU 120, GPU 130, and wireless chip 140. Such a display may also generate heat as it receives and displays information to a user.

Chassis 210 may include a metal base 110. In some embodiments, metal base 110 may be formed by a sheet of directionally extruded metal. In some embodiments, metal base 110 may be formed by cast metal. Metal base 110 may have a thermal conductance that depends on the thermal conductance of the metal with which metal base 110 may be formed. Accordingly, metal base 110 may conduct heat that is generated by various devices that may be either directly or indirectly coupled to chassis 210.

Metal base 110 may comprise any suitable type of metal. In some embodiments, metal base 110 may include aluminum ("Al"), which may have a thermal conductivity in the range of approximately 200 W/mK. Metal base 110 may also include any suitable Al-based alloy. Examples of such alloys may include approximately 85% to 90% Al, with the remaining 10% to 15% including one or more of titanium ("Ti"), zinc ("Zn"), or lithium ("Li"), not counting trace impurities and/or other impurities. In some embodiments, metal base 110 may include magnesium ("Mg"), which may have a thermal conductivity of in the range of approximately 150 W/mK. Metal base 110 may also include any suitable Mg-based alloy. Examples of such alloys may include, but are not limited to, approximately 85% to 90% Mg, with the remaining 10% to 15% including one or more of manganese ("Mn"), chromium ("Cr"), Zn, or Li, not counting trace impurities and/or other impurities. Further, metal base 110 may include Iron ("Fe") and/or any suitable Fe-based alloy.

The thickness of chassis 210 may depend on multiple factors. For example, chassis 210 must be thick enough to have a sufficient stiffness to hold in place various information-handling-system components that may be coupled to chassis 210. Accordingly, the minimum thickness of chassis 210 may depend at least in part on the stiffness of the metal or metal-alloy that may form metal base 110. For example, in some embodiments of chassis 210 that are made with aluminum or an aluminum-alloy, metal base 110 may be at least 0.40 mm thick, and in other embodiments, at least 0.60 mm thick.

The thickness of chassis 210 may also depend on size constraints within information handling system 200. In embodiments of information handling system 200 such as laptop computers, tablet computers, and/or mobile devices, a thin design for information handling system 200 as a whole may require internal components to also be thin. Accordingly, the design constraints of information handling system 200 may require that the total thickness of chassis 210 does not exceed, as an example only, approximately 1.20 mm. Other embodiments of information handling system 200 may have more or less stringent size constraints depending on the product design. For example, the size constraints for some embodiments of information handling system 200 may require that the total thickness of chassis 210 does not exceed a maximum thickness ranging from approximately 0.80 mm to approximately 1.60 mm.

The various layers of chassis 210 depicted in FIG. 1 may have varying thicknesses, and are not necessarily drawn to scale in FIG. 1. Reflective layer 230 and insulation layer 240 may resist different types of heat transfer, while conductive layer 250 may include a highly thermally conductive material. Accordingly, heat generated by GPU 120, CPU 130, and/or wireless chip 140 may be at least partially blocked from travelling in the direction of z-axis 170 by reflective layer 230 and insulation layer 240, and may instead be routed in the direction of x-axis 160 or y-axis 150 via conductive layer 250. As a result, heat may be prevented from conducting through metal base 110, through an information-handling-system shell (not expressly shown) that may be coupled to the bottom side of chassis 210, and to a user who may be holding information handling system 200. Because the transfer of heat in chassis 210 may be directionally dependent, chassis 210 may be referred to as having an anisotropic thermal conductance.

Reflective layer 230 may include a composition that reflects infrared ("IR") radiation. Accordingly, reflective layer 230 may block heat transfer in the form of IR radiation from components such as CPU 120, GPU 130, and/or wireless chip 140. For example, reflective layer 230 may include silver. Though higher purities of silver may be more effective at reflecting IR radiation, the cost of silver may be directly tied to its purity. Accordingly, some embodiments of reflective layer 230 may include a silver alloy that may retain the majority of the IR reflectivity of pure silver or nearly pure silver, but at a fraction of the monetary cost. For the purposes of the present disclosure, an embodiment of reflective layer 230 that includes pure silver, impure silver, or any silver alloy, may be referred to as including silver. In some embodiments, reflective layer 230 may include a silver-tin alloy that may be approximately 60% to 90% silver and approximately 10% to 40% tin, not counting trace impurities and/or other impurities. Though an exemplary range is described in the preceding sentence, in some embodiments, reflective layer 230 may include silver alloys with higher or lower percentages of silver depending on the IR reflectivity requirements and/or the cost restraints for various embodiments of information handling system 200. Moreover, in some embodiments, reflective layer 230 may include other metals or metal alloys with IR-radiation reflective properties, including, but not limited to, gold, nickel, aluminum, and/or gadolinium. The thickness of reflective layer 230 containing such elements described above may, in some embodiments, be in the range of at least 100 nm for the reflective properties of the material to be effective.

Insulation layer 240 may include a composition that has a low rate of heat conduction. Accordingly, insulation layer 240 may insulate metal base 110 from conductive heat transfer from components such as CPU 120, GPU 130, and/or wireless chip 140. The characteristics of heat conduction in a material may be governed by the material's thermal conductivity under steady-state conditions, and its thermal diffusivity under transient conditions. The two properties can be described by the following equation:

$$K = \alpha * c * \rho$$

where K is the thermal conductivity, $\alpha$ is the thermal diffusivity, c is the heat capacity, and $\rho$ is the density of the material. According to this equation, insulation layer 240 may include a material with a low thermal diffusivity and a low heat capacity in order to achieve a low thermal conductivity. Moreover, the thermal conductivity of insulation layer 240 may be further reduced by reducing the density of the material forming insulation layer 240.

In some embodiments, insulation layer 240 may include a composition of two or more elements, at least one of which may have a low thermal diffusivity and a low heat capacity, and thus may have a low thermal conductivity. Such elements may also have a high stiffness that may contribute to the total stiffness of chassis 210. In some embodiments, the two or more elements may include an metal from a group low-thermal-conductance metals including, but not limited to, bismuth ("Bi"), selenium ("Se"), Li, Mg, Zn, Ti, niobium ("Nb"), tantalum ("Ta"), vanadium ("V"), silicon ("Si"), and germanium ("Ge"). Though Si is typically not considered a metal element, Si may include the low thermal conductive properties of the other listed elements, and for the purposes of this disclosure, may be referred to as a metal and/or referred to as a member of a group of low thermal conductance metals. For example, insulation layer 240 may include a composition of Bi, which may have a thermal conductivity of approximately 8.0 W/mK, and Se, which may have a thermal conductivity of approximately 0.5 W/mK.

In some embodiments, insulation layer 240 may include a two-element composition that may be configured in a manner that decreases the density of insulation layer 240, and thus further decreases the thermal conductivity of insulation layer 240. For example, Bi and Se may be configured in a disordered network of grains (also known in the art as being configured in a "disordered phase" or in an "amorphous phase"). A composition including Bi and Se configured in a disordered phase may be referred to herein as a disordered-phase Bi/Se composition. The thickness of insulation layer 240 may be any suitable thickness depending on the amount of heat generated by components such as CPU 120, GPU 130, and/or wireless chip 140, and the amount of thermal insulation that is required for a given embodiment of information handling system 200. For example, in some embodiments, the thickness of the insulation layer 240 may range from approximately 10 μm or less to approximately 200 μm or more. In such embodiments, individual grains of the two elements in a disordered-phase composition may have dimensions ranging from, for example, 5 μm to 50 μm. In some embodiments, a disordered-phase Bi/Se composition may achieve a low post-anneal thermal conductivity down to, for example, approximately 0.05 W/mK to approximately 0.8 W/mK, depending in part on the percentage of Se in the composition and the number and thickness of the pre-anneal layers of Bi and Se used to create the disordered-phase Bi/Se composition. Processes by which a disordered-phase composition of two elements (e.g., Bi and Se) may be formed, including the pre-anneal deposition element layers and annealing step are described in greater detail below with reference to FIG. 3.

In some embodiments, a multi-element compound may be utilized in place of one of the two elements in the above described two-element disordered-phase composition. For example, some embodiments may include a disordered-phase composition of Bi and any suitable ternary alloy. In some embodiments, the ternary alloy may include an alloy from a group including, but not limited to, a magnesium-silicon-tin alloy ("MgSiSn"), a magnesium-zinc-manganese alloy ("MgZnMn"), an iron-vanadium-aluminum alloy ("FeVAl"), a nickel-aluminum-chromium ("NiAlCr"), a bismuth-silver-aluminum alloy ("BiAgAl"), or a titanium-aluminum-vanadium alloy ("TiAlV"). In such embodiments, the ternary alloy may comprise any suitable percentages of the ternary alloy's respective elements.

In some embodiments, insulation layer 240 may include two metals or metal alloys that are diffusion bonded. For example, in some embodiments, insulation layer 240 may include a sub-layer of Bi or a Bi-alloy and a sub-layer of Se or a Se-alloy that may be diffusion bonded to each other. During diffusion bonding, atoms of Bi and Se for example, may migrate across the interface of the two metals creating a mixture of the two elements. In some embodiments, a diffusion-bonded combination of Bi and Se may achieve a low thermal conductivity down to, for example, approximately 0.2 W/mK to approximately 2.0 W/mK, depending in part on the percentage of Bi and Se in the composition. Processes by which a diffusion-bonded combination of two elements (e.g., Bi and Se) may be formed is described in greater detail below with reference to FIG. 4.

Conductive layer 250 may include a highly conductive material that may allow heat generated by devices such as CPU 120, GPU 130, and/or wireless chip 140 to be purposefully routed in a direction along x-axis 160 and/or y-axis 150. For example, conductive layer 250 may comprise materials such as copper, which may have a thermal conductivity of approximately 400 W/mK. In some embodiments, conductive layer 250 may comprise a carbon polymorph, such as graphite, graphene, or graphone, which may have a thermal conductivities in the range of approximately 300 to 600 W/mK. Conductive layer 250 may be patterned such that it conducts heat in a specifically designed direction. Such patterns are described in further detail below with reference to FIG. 2. Conductive layer 250 may be configured at any suitable thickness. A larger thickness may allow conductive layer 250 to more effectively conduct heat in an intended direction. However, the thickness of conductive layer 250 may contribute to the total thickness of chassis 230, which, as described above, may be limited by size constraints for information handling system 200 as a whole. In some embodiments, conductive layer 250 may comprise, for example, a layer of copper that may be 100 μm thick. In some embodiments, conductive layer 250 may have a thickness that may be larger or smaller than 100 μm, depending on the heat conduction requirements and/or the size constraints of information handling system 200.

Though chassis 210 may be depicted in FIG. 1 as including metal base 110, reflective layer 230, insulation layer 240, and conductive layer 250, some embodiments of chassis 210 may include any suitable combination of those layers. For example, in some embodiments, chassis 210 may include at least metal base 110 and insulation layer 240, but may omit reflective layer 230. Likewise, in some embodiments, chassis 210 may include at least metal base 110 and reflective layer 230, but may omit insulation layer 240. Further, various embodiments of chassis 210 may include or may omit conductive layer 250.

Though chassis 210 may be describe above in reference to FIG. 1 as including reflective layer 230 and/or insulation layer 240, which may be located between metal base 110 and heat-generating devices such as CPU 120, GPU 130, and wireless chip 140, in some embodiments, insulation layer 240 and/or reflective layer 230 may be located on the opposite side of metal base 110 as compared to heat-generating devices such as CPU 120, GPU 130, and wireless chip 140. Accordingly, heat generated by devices such as CPU 120, GPU 130, and wireless chip 140 may, in some embodiments, be allowed to conduct heat through metal base 110. However, in such embodiments, insulation layer 240 and/or reflective layer 230 may nonetheless insulate an information-handling-system shell (not expressly shown), which may be coupled to the bottom of chassis 210, from metal base 110. Accordingly, insulation layer 240 and/or reflective layer 230 may insulate a user holding the shell of information handling system 200 from heat generated by CPU 120, GPU 130, and/or wireless chip 140.

Figure 2:
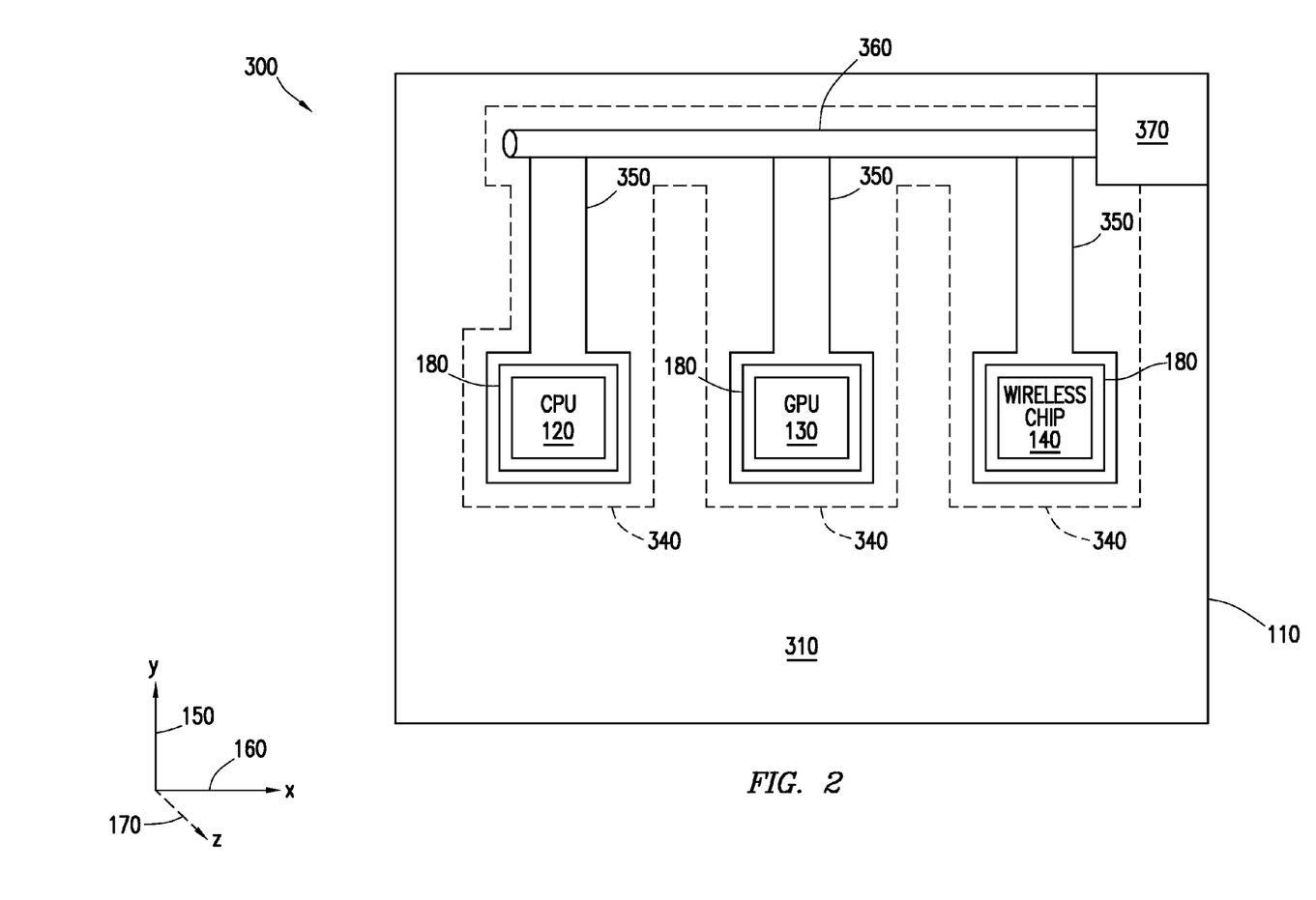
FIG. 2 illustrates a top view of certain components of an information handling system, in accordance with certain embodiments of the present disclosure.

FIG. 2 illustrates a top view of certain components of information handling system 300, in accordance with certain embodiments of the present disclosure. As shown in FIG. 2, information handling system 300 may include an insulated chassis 310 to which heat generating devices such as CPU 120, GPU 130, and/or wireless chip 140 may be coupled, and to which heat-dissipating devices (also referred to herein as "cooling devices") such as a heat pipe 360 and fan 370 may be coupled.

In some embodiments, chassis 310 may include metal base 110 and a patterned insulation layer, e.g., insulation layer 340. As shown in FIG. 2, insulation layer 340 may be patterned such that it insulates metal base 110 from one or more heat-generating devices and/or one or more heat conductors. For example, insulation layer 340 may be patterned such that it insulates metal base 110 from CPU 120, GPU 130, wireless chip 140, conductive layer 350, and/or heat pipe 360, but may otherwise not cover metal base 110. Accordingly, non-insulated portions of metal base 110 may be exposed to open air within information handling system 300, allowing any heat that is transferred to metal base 110 despite the provided insulation to dissipate through convection. Moreover, as a result of patterning insulation layer 340, the amount of insulating material (e.g., a disordered-phase Bi/Se composition) that may be used to form insulation layer 340 may be minimized, reducing the costs associated with that material.

In some embodiments, chassis 310 may also include a reflective layer that is patterned. In some embodiments, the patterned reflective layer may be located underneath, and patterned in a similar manner as an insulation layer, e.g., insulation layer 340. Accordingly, the patterned reflective layer may be patterned to block IR radiation travelling in the direction of z-axis 170 from one or more of CPU 120, GPU 130, wireless chip 140, conductive layer 350, and/or heat pipe 360, but may otherwise not cover metal base 110. Thus, the amount of IR reflecting material, from which the patterned reflective layer may be formed, may be minimized, reducing the costs associated with that material.

In some embodiments, the patterned reflective layer may be patterned differently than insulation layer 340. For example, in some embodiments, the patterned reflective layer may be patterned to block IR radiation from heat generating devices such as CPU 120, GPU 130, and/or wireless chip 140, but may be omitted from other areas corresponding to heat pipe 360 and portions of conductive layer 350 that do not overlap or are not adjacent to CPU 120, GPU 130, and/or wireless chip 140. Accordingly, the IR-reflective qualities of the patterned reflective layer may be utilized in locations that may generate the most IR radiation, while the materials cost associated with the patterned reflective layer may be further minimized.

In some embodiments, chassis 310 may include a patterned conductive layer, e.g., conductive layer 350, that may be patterned to conduct heat directly or indirectly to a cooling device, such as heat pipe 360 and/or fan 370. For example, as shown in FIG. 2, conductive layer 350 may be patterned to conduct heat from CPU 120, GPU 130, and wireless chip 140 toward heat pipe 360. In turn, heat pipe 360 may be configured to be cooled at one end by fan 370.

Figure 3:
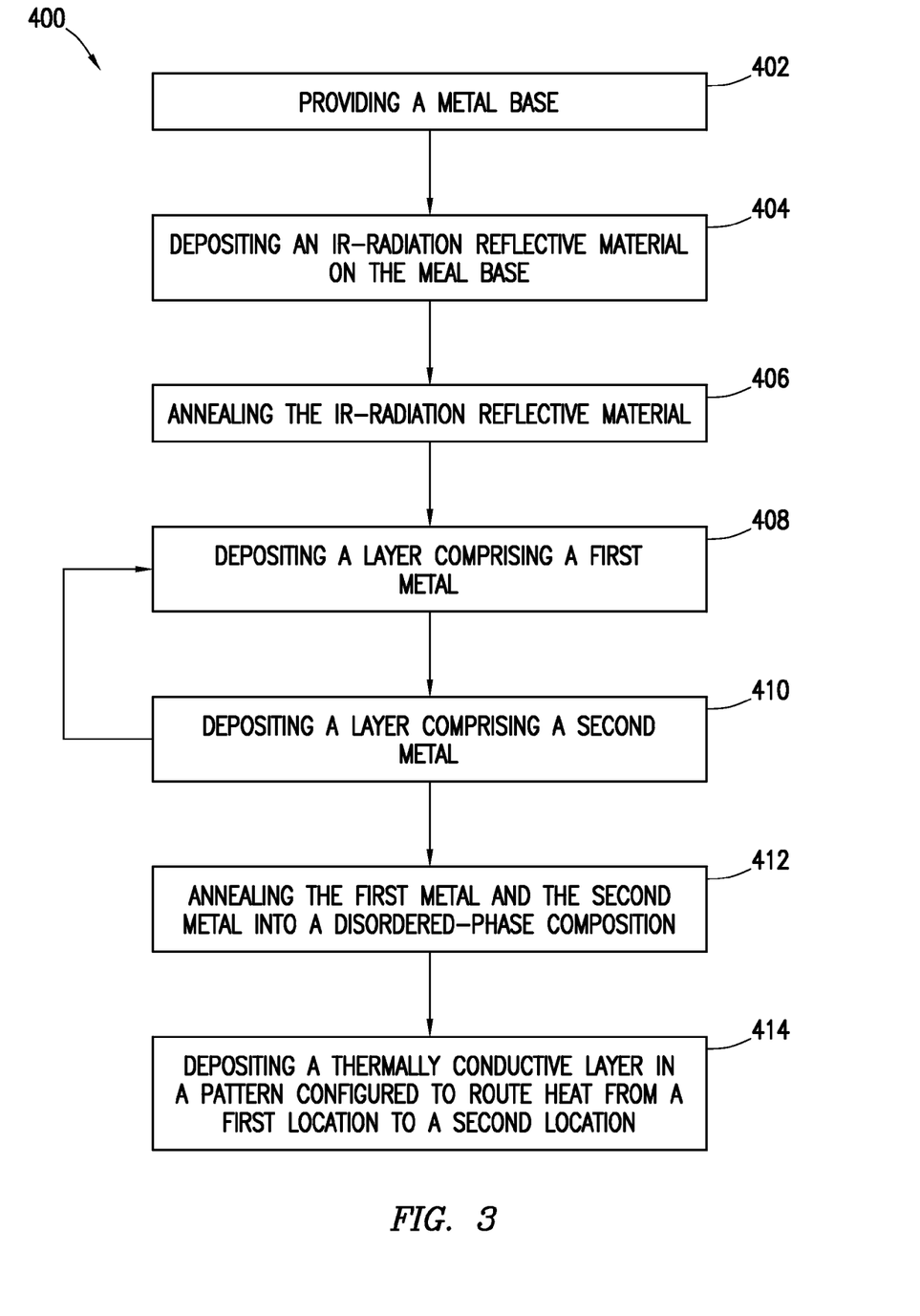
FIG. 3 illustrates a flow chart of an example method for manufacturing a chassis, in accordance with certain embodiments of the present disclosure.

FIG. 3 illustrates a flow chart of an example method for manufacturing a chassis, in accordance with certain embodiments of the present disclosure.

At step 402, method 400 may require providing a metal base. In some embodiments, the metal base may be formed by a sheet of directionally extruded metal. In some embodiments, the metal base may be formed by casted metal. The metal base may include any suitable metal, for example, Al, Mg, Fe, or any suitable Al-based, Mg-based, or Fe-based alloy.

At step 404, method 400 may require depositing an IR-radiation reflective material on the metal base. In some embodiments, the IR-radiation reflective material may include, for example, silver or a silver-based alloy such as a silver-tin alloy. The IR-radiation reflective material may be deposited in a pattern. For example, a patterned mask may be used during a sputtering deposition of the IR-radiation reflective material to allow the material to be deposited only in desired areas corresponding, for example, to the location of heat generating devices and/or heat conduction paths.

As described above with reference to FIG. 1, a reflective layer may, in some embodiments, be located in direct contact with the metal base, and may, in some embodiments, be located on top of the insulation layer, which may be in direct contact with the metal base. Accordingly, depositing an IR-radiation reflective material "on the metal base" may refer to either depositing the IR-radiation reflective material directly on the metal base or depositing the IR-radiation reflective material indirectly on the metal base with one or more intervening layers located between the metal base and the IR-radiation reflective material.

At step 406, method 400 may require annealing the IR-radiation reflective material. In some embodiments, the IR-radiation reflective material may be annealed by a process known in the art as rapid thermal annealing. For example, a chassis may be rapidly heated with a temperature of 500° C. for approximately five to ten minutes and subsequently cooled. Upon annealing, the IR-radiation reflective material may form a reflective layer.

At step 408, method 400 may require depositing a first layer comprising a first metal on a metal base. In some embodiments, the first metal may include an element from a group low-thermal-conductance metals including, but not limited to, Bi, Se, Li, Mg, Al, Zn, Ti, Nb, Ta, V, Si, and Ge. For example, in some embodiments, the first metal may include Bi. The Bi layer may be deposited by any suitable means. For example, the Bi layer may be deposited through chemical vapor deposition, sputtering, or any other suitable techniques.

As described above with reference to FIG. 1, an insulation layer may, in some embodiments, be located in direct contact with a metal base, and may, in some embodiments, be located on top of a reflective layer, which may be in direct contact with the metal base. Accordingly, depositing a first layer of a first metal "on the metal base" may refer to either depositing the first layer of the first metal directly on the metal base or depositing the first layer of the first metal indirectly on the metal base with one or more intervening layers located between the metal base and the first layer of the first metal.

At step 410, method 400 may require depositing a second layer comprising a second metal on the first layer of the first metal. In some embodiments, the second metal may include an element from a group low-thermal-conductance metals including, but not limited to, Bi, Se, Li, Mg, Al, Zn, Ti, Nb, Ta, V, Si, and Ge. For example, in some embodiments, the second metal may include Se. The Se layer may be deposited by any suitable means. For example, the Se layer may be deposited through chemical vapor deposition, sputtering deposition, or any other suitable techniques. In some embodiments, a multi-element compound may be utilized in place of an element such as Se. In some embodiments the second layer may be deposited that may include a ternary alloy, for example, MgSiSn, MgZnMn, FeVAl, NiAlCr, BiAgAl, or TiAlV.

After step 410, method 400 may repeat step 408 and step 410 any suitable number of times. In some embodiments, repeated cycles of step 408 and step 410 may result in alternating layers of the first metal and the second metal. For example, when repeating step 408, method 400 may require depositing a third layer comprising the first metal on the second layer comprising the second metal. Further, when repeating step 410, method 400 may require depositing a fourth layer comprising the second metal on the third layer comprising the first metal. Accordingly, repeated cycles of step 408 and step 410 may result in alternating layers of the first metal (e.g., Bi) and the second metal (e.g., Se). Though Bi is described above as the first low-thermal-conductance metal and Se is described above as the second low-thermal-conductance metal, in some embodiments, Se may be the first low-thermal-conductance metal, and Bi may be the second low-thermal-conductance metal.

During step 408 and step 410, the layers of the first and second metals may be deposited in a pattern. For example, a patterned mask may be used during respective chemical vapor depositions or sputtering depositions to allow the respective layers to be deposited only in desired areas corresponding, for example, to the location of heat generating devices and/or heat conduction paths.

After step 408 and step 410 have been completed a suitable number of times, method 400 may proceed to step 412. At step 412, method 400 may require annealing the first metal and the second metal into a disordered-phase composition. This disordered-phase composition may form an insulation layer. In some embodiments, the one or more layers of the first metal and the one or more layers of the second metal may be annealed by a process that is known in the art as rapid thermal annealing. For example, layers of Bi and Se may be rapidly heated with a temperature of 500° C. for approximately five to ten minutes and subsequently cooled. The rapid thermal anneal of Bi and Se layers may cause the Bi and the Se to form a disordered-phase Bi/Se composition. Though a portion of the material, up to 20% for example, may react and form a compound such as $BiSe_2$, the rapid nature of the rapid thermal anneal may cause the majority of the Bi and Se to form a disordered network of Bi grains and Se grains. Such a disordered-phase Bi/Se composition may have a low density compared to Bi and/or Se individually. The reduced density of the two-element disordered-phase composition may further reduce the thermal conductivity of the insulation layer. Moreover, the thickness of the annealed disordered-phase Bi/Se composition may be greater than the total thickness of the Bi and Se layers prior to the rapid thermal anneal. In some embodiments, the thickness of the two-element disordered-phase composition may be, for example, 5% to 20% greater than the total thickness of the individual pre-anneal layers depending on the two elements (e.g., Bi and Se) that are selected for the two-element disordered-phase composition.

As described above with reference to FIG. 1, the thickness of an insulation layer may range from approximately 10 μm or less to approximately 200 μm or more. In such embodiments, individual grains of Bi and/or individual grains of Se in the disordered-phase Bi/Se composition may have dimensions ranging from, for example, 5 μm to 50 μm. The total thickness of the insulation layer may depend on the size of the individual layers deposited during step 408 and step 410 and the number of times that step 408 and step 410 are repeated. For example, in some embodiments, each cycle of step 408 and step 410 may deposit a 1 μm-thick layer of Bi and a 1 μm-thick layer of Se. In some embodiments, step 408 and step 410 may be repeated 5 times, resulting in a pre-anneal thickness of 10 μm. After the rapid thermal anneal, the insulation layer may have a thickness of approximately 10.5 μm to 12 μm, for example. In some embodiments, step 408 and step 410 may be repeated 50 times, resulting in a pre-anneal thickness of 100 μm. After the rapid thermal anneal, the insulation layer may have a thickness of approximately 105 μm to 120 μm, for example. After the Bi and Se layers have been rapidly thermally annealed, method 400 may proceed with step 414.

At step 414, method 400 may require depositing a thermally conductive layer in a pattern configured to route heat from a first location to a second location. In some embodiments, the conductive layer may include copper, which may be deposited, for example, by sputtering. In some embodiments, a patterned mask may be used during a copper sputtering process to allow the conductive layer to be deposited only in desired areas. For example, the conductive layer may be patterned in a configuration for routing heat from a first location corresponding to a heat generating device such as CPU 120, GPU 130, or wireless chip 140, to a second location corresponding to a cooling device such as heat pipe 360 or fan 370.

Although FIG. 3 discloses a particular number of steps to be taken with respect to method 400, method 400 may be executed with greater or lesser steps than those depicted in FIG. 3. For example, as described above, step 408 and step 410 may be repeated any suitable number of times depending on the desired thickness of the insulation layer, and the desired total thickness of the chassis. Likewise, in some embodiments, the chassis may include an insulation layer, but may omit a reflective layer. Accordingly, in some embodiments, method 400 may omit step 404 and step 406. Similarly, in some embodiments, a chassis may an include a reflective layer, but may omit an insulation layer. Accordingly, in some embodiments, method 400 may omit steps 408, 410, and 412. In addition, although FIG. 3 discloses a certain order of steps to be taken with respect to method 400, the steps comprising method 400 may be completed in any suitable order. For example, in some embodiments, a reflective layer may be located above an insulation layer. In such embodiments, steps 408, 410, and 412 may be completed prior to steps 404 and 406.

Figure 4:
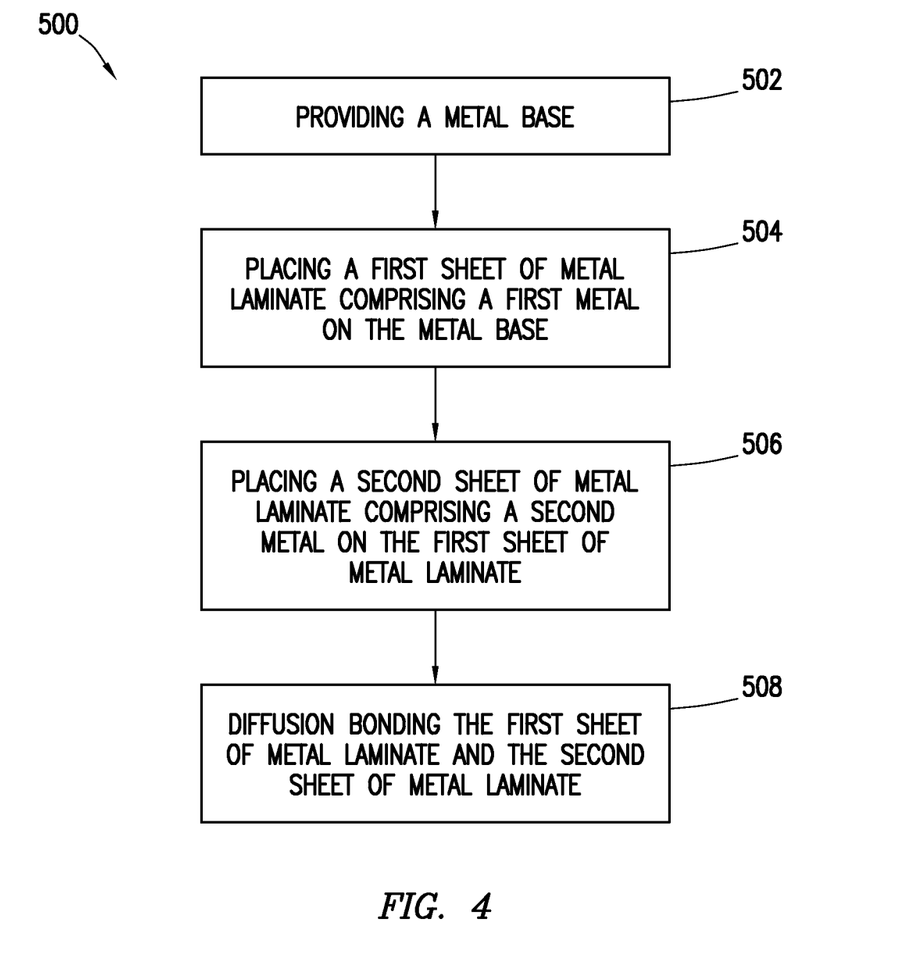
FIG. 4 illustrates a flow chart of an example method for manufacturing a chassis, in accordance with certain embodiments of the present disclosure.

FIG. 4 illustrates a flow chart of an example method for manufacturing a chassis, in accordance with certain embodiments of the present disclosure.

At step 502, method 500 may require providing a metal base. In some embodiments, the metal base may be formed by a sheet of directionally extruded metal. In some embodiments, the metal base may be formed by casted metal. The metal base may include any suitable metal, for example, Al, Mg, Fe, or any suitable Al-based, Mg-based, or Fe-based alloy.

At step 504, method 500 may require placing a first sheet of metal laminate comprising a first metal on the metal base. The first sheet of metal laminate may be in a foil-like form and may include any suitable metal or metal alloy. In some embodiments, the first metal may include an element from a group of low-thermal-conductance metals including, but not limited to, Bi, Se, Li, Mg, Al, Zn, Ti, Nb, Ta, V, Si, and Ge. For example, the first metal may include Bi or a Bi-alloy.

As described above with reference to FIG. 1, an insulation layer may, in some embodiments, be located in direct contact with a metal base, and may, in some embodiments, be located on top of a reflective layer, which may be in direct contact with the metal base. Accordingly, placing a first sheet of metal laminate comprising a first metal "on the metal base" may refer to either placing the first sheet of metal laminate directly on the metal base or placing the first sheet of metal laminate indirectly on the metal base with one or more intervening layers located between the metal base and the first sheet of metal laminate.

At step 506, method 500 may require placing a second sheet of metal laminate comprising a second metal on the first sheet of metal laminate. The second sheet of metal laminate may be in a foil-like form and may include any suitable metal or metal alloy. In some embodiments, the second metal may include an element from a group of low-thermal-conductance metals including, but not limited to, Bi, Se, Li, Mg, Al, Zn, Ti, Nb, Ta, V, Si, and Ge. For example, the second metal may include Se or an Se-alloy.

At step 508, method 500 may require diffusion bonding the first sheet of metal laminate and the second sheet of metal laminate. In some embodiments, diffusion bonding the first sheet of metal laminate and the second sheet of metal laminate may be achieved by diffusion welding, whereby the first and second sheets are pressed together at an elevated temperature, for example, at 50% to 70% of the melting point of the metals. In some embodiments, diffusion bonding may be achieved by high current electrical welding. Diffusion bonding (via diffusion welding, high current welding, or any other suitable technique) may cause the migration of atoms across the interface of the first sheet of metal laminate and second sheet of metal laminate. Accordingly, an insulation layer may be formed including a mixture of metals, for example, Bi and Se.

Though method 500 is described above with two sheets of metal laminate, in some embodiments, additional sheets of metal laminate may be added and diffusion bonded with the first sheet of metal laminate and the second sheet of metal laminate. For example, after step 506, a third sheet of metal laminate may be placed on the second sheet of metal laminate. The third sheet of metal laminate may be diffusion bonded along with the first sheet of metal laminate and the second sheet of metal laminate at step 508.

Although the present disclosure has been described in detail, it should be understood that various changes, substitutions, and alterations can be made hereto without departing from the spirit and the scope of the disclosure as defined by the appended claims.

What is claimed is:

1. An information handling system, comprising:
a chassis comprising:
a metal base; and
a single thermal insulation layer consisting of a disordered-phase composition of a first metal and a second metal, wherein the thermal insulation layer comprises bismuth and selenium; and
a processing unit coupled to the chassis.

2. The information handling system of claim 1, wherein the thermal insulation layer comprises at least one element from the group of lithium, magnesium, aluminum, zinc, titanium, niobium, tantalum, vanadium, silicon, and germanium.

3. The information handling system of claim 1, wherein:
the first metal includes at least one element from the group of bismuth, lithium, magnesium, aluminum, zinc, titanium, niobium, tantalum, vanadium, silicon, and germanium; and
the second metal includes a ternary alloy.

4. The information handling system of claim 3, wherein the ternary alloy comprises one of the group of magnesium-silicon-tin, magnesium-zinc-manganese, iron-vanadium-aluminum, nickel-aluminum-chromium, bismuth-silver-aluminum, and titanium-aluminum-vanadium.

5. The information handling system of claim 1, wherein the thermal insulation layer is configured in a pattern corresponding at least to the location of the processing unit.

6. The information handling system of claim 1, wherein the chassis further comprises a reflective layer including an infrared radiation reflective material.

7. The information handling system of claim 6, wherein the infrared radiation reflective material includes silver.

8. The information handling system of claim 6, wherein the reflective layer is configured in a pattern corresponding at least to the location of the processing unit.

9. The information handling system of claim 1, wherein the chassis further comprises a thermally conductive layer configured in a pattern to route heat from a first location corresponding to the processing unit to a second location corresponding to a cooling device coupled to the chassis.

* * * * *